United States Patent Office 3,467,647
Patented Sept. 16, 1969

3,467,647
CATIONIC AND ANIONIC SUBSTITUTED POLYSACCHARIDES AND PROCESS FOR PREPARING SAME
Harm Benninga, Noordlaren, Netherlands, assignor to W. A. Scholten's Chemische Fabrieken N.V., Groningen, Netherlands, a corporation of the Netherlands
No Drawing. Filed Mar. 8, 1967, Ser. No. 621,425
Claims priority, application Great Britain, Mar. 10, 1966, 10,472/66
Int. Cl. C08b 19/04
U.S. Cl. 260—209          14 Claims

ABSTRACT OF THE DISCLOSURE

Cationic and anionic substituents are introduced into polysaccharides, more particularly starches and certain plant mucilages so as to produce polysaccharide derivatives with a predetermined isoelectric point which have protein-like properties. They are valuable for various industrial purposes, in which the production of films or coatings of reduced solubility in water or the stabilization of aqueous dispersions of fine particles are of importance. The new polysaccharide derivatives are, for instance, particularly suitable for the production of water-resistant pigment coated paper.

---

At present several processes are known for the modification of water-dispersible polysaccharides, such as starches and plant mucilages, by introducing substituent groupings into the polysaccharide molecule. These derivatization treatments change the properties of the water-dispersible polysaccharides so that they will meet the requirements for specific uses more readily. For several industrial applications the introducion of a relatively small number of ether or ester groups is usually sufficient to impart the desired properties. The number of substituent groupings per monomeric unit in a polysaccharide molecule is often referred to as degree of substitution (DS). The substituent groupings may be anionic, nonionic or cationic in nature. The introduction of these substituents usually enhances the solubility in water of the water-dispersible polysaccharides, so that they provide clearer and more stable solutions. The presence of electrically charged groups, such as anionic groups, for example carboxyl, sulphate, sulphonate or phosphate or cationic groups, for example amino, substituted amino or quaternary ammonium, has a marked effect on the bonding of the water-dispersible polysaccharide to various substrates, and thereby can aid in the more efficient utilization of these polysaccharides, for example, in adhesive and sizing operations.

We have now found that new derivatives of exceptional properties may be obtained by introducing both cationic and anionic substituent groups into water-dispersible polysaccharides, which are starches or plant mucilages, and selecting the nature of and the ratio between the cationic and the anionic substituents, so as to produce polysaccharide derivatives with a predetermined isoelectric point within the pH range of between about 2 and about 10.5.

The polysaccharide derivatives so obtained have protein-like properties. As is known proteins are naturally occurring macromolecules containing carboxyl and amino groups. The dissociation of these groups is dependent upon the pH. The isoelectric point is the pH at which the number of positive charges equals the number of negative charges on the protein macromolecule. When direct current is applied to an aqueous solution of the protein at this pH the macromolecules will not move.

According to the present invention it is now possible to impart proteinaceous properties to starches and plant mucilages. The presence of both anionic and cationic groups is reflected in the properties of the aqueous dispersions of the new polysaccharide derivatives and their behaviour at various pH levels.

Variation in kind and balance of the anionic and cationic substituents can be used to change the isoelectric point of the protein-like polysaccharide derivatives at will over a wide pH range. The properties of the said polysaccharide derivatives can moreover be controlled by varying the DS of the substituent groups.

Low-substituted derivatives, with a DS of the cationic and anionic substituents of from about 0.02 to about 0.10 substituent per monomeric unit of the polysaccharide molecule have pronounced film-forming and stabilizing properties, while in the more highly substituted, derivatives, the stabilizing properties are more preponderant. Both the low DS and the higher DS derivatives may exhibit an improved compatibility with other polymeric substances, for example, proteins, such as casein and gelatin.

Starch is preferred for use as a water-dispersible polysaccharide. The term "starch" when used in this specification includes both natural starch and modified starches, such as dextrinated, hydrolyzed, oxidized, cross-linked, alkylated, hydroxyalkylated, acetylated or fractionated starch (amylose and amylopectin). The starch may be of any origin, for example, corn starch, wheat starch, potato starch, tapioca starch, sago starch, rice starch, waxy corn starch or high-amylose corn starch.

Other water-dispersible polysaccharides suitable for the purpose of the present invention are natural plant mucilages such as carob gum, guar gum or tamerind seed gum, as well as the various water soluble modifications of these compounds.

Cationic substituents may be introduced into the polysaccharide molecule by reacting the water-dispersible polysaccharide, preferably in the presence of a catalyst, and usually by an etherification or esterification reaction, with one or more reagents which contain a cationic group, such as a primary, secondary or tertiary amino group or a quaternary ammonium, sulphonium or phosphinium group. Typical reagents which may be reacted with the polysaccharide for producing cationic derivatives are ethylene imine, N-(2-hydroxyethyl) ethylene imine, cyanamide, beta morpholinoethylchloride, beta diethyl aminoethylchloride, 3-diethyl amino 1,2-epoxypropane dimethyl aminoethyl methacrylate, N-(2,3-epoxypropyl) trimethyl ammonium chloride, (4-chlorobutene-2) trimethyl ammonium chloride, 2-chloroethyl methyl ethyl sulphonium iodide and 2-chloroethyl tributylphosphonium chloride. The preferred cationic substituent groups are the tertiary amino alkyl or hydroxyalkyl group or the quaternary ammonium alkyl or hydroxyalkyl group.

The anionic groups may be a carboxyl, a sulphonate, a sulphate or a phosphate group. The introduction of one or more of these groups into the molecules of the water-dispersible polysaccharides may be achieved by various methods.

The carboxyl group may be introduced into the polysaccharide molecule by reacting the water-dispersible polysaccharide with:

a mono halogen substituted fatty acid, for example monochloro acetic acid, in the presence of an alkaline catalyst;
certain anhydrides for example succinic anhydride, maleic anhydride or citraconic anhydride, in the presence of an alkaline catalyst;
methyl and ethyl esters of acrylic acid, crotonic acid or itaconic acid, in the presence of an alkaline catalyst;
acrylonitrile, in the presence of an alkaline catalyst, followed by hydrolysis of the cyanoethyl groups;
sodium periodate followed by a treatment with sodium chlorite for transforming the carbonyl groups into carboxyl groups.

Suphonate groups may be introduced into the polysaccharide molecule by reacting the water-dispersible polysaccharide with for instance:

sultones, in the presence of an alkaline catalyst;
the sodium salt of halo alkane sulphonic acids, chlorooxypropane sulphonic acid or epoxypropane sulphonic acid, in the presence of an alkaline catalyst;
ethene sulphonic acid, in the presence of an alkaline catalyst;
sodium periodate followed by a treatment with sodium or potassium bisulphite.

Both carboxyl and sulphonate groups are introduced when the water-dispersible polysaccharides are reacted with an anhydride of an unsaturated acid, for example maleic acid, and bisulphite is added to the unsaturated bond of the polysaccharide halfester thus obtained.

Sulphate groups can easily be introduced, e.g., by reacting the water-dispersible polysaccharides with addition products of sulphur trioxide and a tertiary amine, or by treatment of the polysaccharide with sulphamic acid and/or sulphuric acid and urea.

Treatment of the water-dispersible polysaccharides with c.q. orthophosphates, polyphosphates or metaphosphates, alone or in combination with urea, or with phosphoric acid or polyphosphoric acid and urea leads to the introduction of phosphate groups.

The preparation of the new derivatives of the water-dispersible polysaccharides may be carried out either in an essentially dry state, in suspension in an aqueous or non aqueous liquid in aqueous dispersion or by any combination thereof. When the water-dispersible polysaccharide is starch, the derivatives containing cationic and anionic groups may be prepared in either the ungelatinized or gelatinized form, and both are suitable for the present invention. In order to produce the starch derivatives in ungelatinized form, it is of course necessary to avoid those conditions of moisture, heat or alkalinity during the reaction, which will cause the starch to gelatinize, or alternatively to add a known gelatinization retarder to the reaction mass, such as sodium sulphate. A product thus made can be filtered and washed, since it is in the original granule form. On the other hand, by using sufficient moisture, heat and/or alkali the starch may be caused to gelatinize during the reaction. This gelatinized mass may be precipitated by the addition of a suitable organic solvent, washed and dried or the gelatinized mass may be dried directly as by passing over heated drums. The same holds true for plant mucilages, when the derivatization reaction is performed in aqueous dispersion. Since it has been found that the absence of salts and other impurities is a marked advantage in various industrial applications of the polysaccharide derivatives of the present invention it is desirable to purify the contaminated dried products, for instance by grinding to a suitable fineness and extraction with a mixture of water and alcohol or other water-miscible organic solvents such as for example acetone or isopropanol. It is possible to carry out the manufacturing process by treating the water-dispersible polysaccharide first with the cationic reagent and subsequently introducing the anionic group. However, it is also possible to start with a water-dispersible polysaccharide which has already been reacted so as to contain anionic groups and to treat this material with the cationic reagent. In practice it is sometimes possible to carry out the reactions with cationic and anionic reagents simultaneously.

After the introduction of the cationic and anionic groups the polysaccharide derivatives may be subjected to known modification procedures, such as modification by acids, oxidizing agents and/or heat.

The polysaccharide derivatives of the present invention, of low as well as of high degree of substitution, possess new and unexpected properties. When in accordance with the present invention a mixed starch derivative of a low DS is prepared which contains for instance about 0.03 acidic and about 0.03 basic groups per monomeric unit, by etherification in aqueous suspension, the mixed starch ether may easily be dispersed by heating the same with water at an appropriated pH which is usually different from the isoelectric pH. The isoelectric point of these mixed ethers is in the pH range from about 4 to about 8, depending upon the kind of the anionic and cationic substituents. Viscosity measurements of dilute aqueous solutions at different pH values show that at the isoelectric point the viscosity is at a minimum. More concentrated aqueous dispersions exhibit, at the isoelectric point, structural viscosity and usually form a gel on standing. The gelation is reversible because when heated, the gel turns into a liquid again, just like a gelatin gel. The viscosity increase may also be of a thixotropic nature in which case the original viscosity may be restored by stirring.

We have surprisingly found that films made from isoelectric dispersions of these low DS derivatives are characterized by a very low solubility in water of ambient temperature, as compared with the water solubility of normal starch ethers of equal DS at the same temperature.

The low DS mixed derivatives therefore may in general be used for producing films and coatings of reduced water solubility. It is known in the art to prepare water resistant films of water-dispersible polysaccharides using aldehyded or aminoplast- and phenol resins as insolubilizing agents. However when such agents are used, the insolubilization occurs under conditions of high acidity and high temperature.

The isoelectric point of the low DS polysaccharide mixed derivatives of the present invention can be changed at will and the derivatives may therefore be manufactured in such a way, that they will form insoluble films under either neutral, weakly acidic or weakly alkaline conditions. This enhances the utility of the products obtained according to the present invention. The new derivatives may be used, for instance, in the production of water resistant sized or coated paper. In the surface sizing of paper with a water-dispersible polysaccharide, a more or less continuous film of the polysaccharide is applied to the surface of the paper to cement the surface fibres to the body of the paper.

In paper coating a layer of pigment particles is deposited on the paper surface. The water-dispersible polysaccharide serves to bond the pigment particles to each other and also to the surface of the paper.

A particular and unexpected property of the low DS mixed derivatives, is that they possess a high protective colloid action as shown by their low gold number, the value of which is in general below 0.02 and for special products as low as 0.005. By way of comparison gelatin, a colloid with a pronounced protective action, has a gold number of 0.005, while unmodified potato starch, a poorly protecting colloid, has a gold number of 20. The gold number is the minimal number of milligrams of a colloid required for preventing the change of red colloid gold to blue, as obtained by the addition of sodium chloride. It is a reciprocal value with respect to the protective action. The low DS mixed derivatives, due to their low gold number, are very suitable for use in all kinds of pigment dispersions and the like, which is another reason to make them very attractive for application in paper coating as mentioned above.

It is more difficult to impart water resistance to a paper coating than to a surface sizing. Therefore, the insolubility of the films of the polysaccharide derivatives of the present invention may be insufficient for some coating purposes. However, the addition of minimal quantities of an aldehyde or an aminoplast resin or phenol resin, far below the level which is necessary for insolubilizing unmodified, water-dispersible polysaccharides or simple derivatives thereof will produce the required water resistance in those cases.

When, on the other hand, according to the invention, more highly substituted polysaccharide derivatives are made, c.e. with a DS above 0.10 e.g., starch derivatives with a DS of about 0.2 basic and about 0.2 acidic groups, the behaviour at the isoelectric point is somewhat different. The pure derivatives cannot be dispersed in water when the pH is at a value equal or close to the isoelectric pH. However when, as in the case of various proteins, the pH is suitably decreased or increased by the addition of acid or alkali to a suitable value or when slight amounts of neutral salts are added, the polysaccharide derivatives can easily be dispersed in water.

These higher substituted derivatives can readily be insolubilized even in solution, by readjusting the pH to the pH of the isoelectric point. Their protective colloid action is at least as good as that of the lower substituted derivatives, their film forming properties being however less pronounced. These more highly substituted polysaccharide derivatives according to the present invention, therefore, are very suitable for application in which a protective colloid action combined with superior insolubilization power is required.

By a proper selection of the kind, balance and DS of the basic and acidic groups it is possible to change the physical properties of the derivatives of the present invention at will. Said derivatives may therefore be utilized for a wide variety of purpose. They are particularly valuable for use in paper coatings, paper and textile sizes, textile finishes, adhesives, paints, photographic emulsions and films, drilling muds, polyurethane foams, synthetic latexes and as thickeners, stabilizers, gelling agents, depressants, flocculating agents and retention aids.

The present invention may be illustrated by, but is in no manner limited to, the following examples. All parts and percentages are by weight unless otherwise indicated.

Example 1

100 parts of water, 20 parts of sodium sulphate and 1.4 parts of sodium hydroxide in 5 parts of water and 100 parts of potato starch are agitated so as to prepare an aqueous alkaline starch suspension. To this suspension, which is heated to 40° C., are added in small successive portions 3 parts of diethylaminoethylchloride in 10 parts of water and 1.2 parts of sodium hydroxide in 30 parts of water. Agitation is maintained for 20 hours at 40° C. The 4.25 parts of propane sultone and 0.2 part of sodium hydroxide in 5 parts of water are added and the reaction is allowed to proceed at 40° C. for 1 hour. The resulting reaction mixture is adjusted to a pH of 6 with dilute sulphuric acid and the starch product is filtered, thoroughly washed with water and dried. The dried product has the following properties:

Diethylaminoethyl groups, DS _____ 0.03
Sulphopropyl groups, DS _____ 0.03
Isoelectric point, pH _____ 6.1 to 6.3
Gold number _____ 0.02

When the viscosity of a 2.5% aqueous dispersion at room temperature is measured at different pH values, the latter being changed by addition of dilute hydrochloric acid or sodium hydroxide, the following results are obtained.

| pH: | Viscosity, cps. |
|---|---|
| 2.0 | 118 |
| 3.2 | 119 |
| 4.1 | 120 |
| 5.2 | 103 |
| 6.2 | 81 |
| 6.5 | 107 |
| 7.1 | 130 |
| 8.2 | 148 |

These figures show that at the isoelectric point the viscosity is at a minimum.

When the derivative is cooked with water at a concentration of 8% and subsequently cooled, a clear cohesive dispersion of intermediate viscosity is obtained. Upon standing overnight it forms a strong, clear gel, which is reversibly liquified by stirring and/or heating.

Example 2

50 parts of the starch derivative described in Example 1 are suspended in 70 parts of 0.9 N sulphuric acid and agitated for 16 hours at 40° C. The pH of the suspension is then adjusted to approximately 7 by adding sodium carbonate. The starch product is filtered, thoroughly washed with water and dried. The resulting acid hydrolysed derivative is cooked in water at a concentration of 25% and cooled, whereby a clear viscous and cohesive dispersion is obtained.

By means of a film applicator (opening 0.5 mm.) the 25% dispersion is applied to a polypropylene sheet. The coated sheet is air dried for approximately 16 hours. The starch derivative film may then easily be peeled off from the base sheet. When the film is submerged in water of room temperature for 6 hours, the films does neither disintegrate nor dissolve.

When, however, films are made of starch derivatives of similar viscosity, which contain only 0.06 cationic or only 0.06 anionic substituent groups, said films dissovle quickly and completely in water of room temperature.

The starch derivative of this example may be advantageously used instead of sodium caseinate, as a binder in a rub resistant wall paint.

Example 3

Example 1 is repeated, but the order of addition of the diethylaminoethylchloride and the propane sultone is reversed. The starch derivative appears to have the same properties as the product of Example 1.

Example 4

Example 1 is repeated, but the 4.25 parts of propane sultone and 0.2 part sodium hydroxide are replaced by 4.05 parts of the sodium salt of monochloro acetic acid and 0.5 part of sodium hydroxide. The reaction is allowed to proceed for 16 hours at a temperature of 50° C. (The starch product is filtered after neutralization, washed and dried.) It has the following properties:

Diethylaminoethyl groups, DS _____ 0.03
Carboxymethyl groups, DS _____ 0.03
Isoelectric point, pH _____ 6.6 to 6.8
Gold number _____ 0.03

When the derivative is cooked in water at a concentration of 8% and subsequently cooled a clear, viscous and cohesive dispersion is obtained of good film forming properties. The film is insoluble in water of ambient temperature.

A part of the starch derivative is subsequently modified by oxidation with 1.5% active chlorine in the form of sodium hypochlorite in aqueous suspension at 30° C. for 5 hours. The neutralized, washed and dried product has a gold number of 0.004.

This derivative when cooked in 20% concentration in water and subsequently cooled gives a fluid, clear and cohesive paste. Films made of this paste are insoluble in water of room temperature. The product may be used as a binder in the manufacture of water resistant wall paper.

Example 5

Example 4 is repeated, but 6.2 parts of the sodium salt of monochloro acetic acid are added together with 1 part of sodium hydroxide. The resulting starch derivative has the following properties:

Diethylaminoethyl groups, DS _____ 0.03
Carboxymethyl groups, DS _____ 0.05
Isoelectric point, pH _____ 3.3 to 3.5

When a 8% dispersion of the product having a pH of 3, 4 is cooked, cooled and left overnight it forms a reversible gel.

A part of the starch derivative of this example is roasted for 3 hours at a temperature of 120° C. and at a pH of 1.8. The product thus obtained is compatible with gelatine. It may be used in the manufacture of baryta paper, which is used as a base for photographic emulsions.

Example 6

In a mixing tank provided with a heating mantle and a stirrer an alkaline starch paste is made by stirring and heating at a temperature of 60° C. a mixture of 1000 parts of tapioca starch, 1500 parts of water and 40 parts of sodium hydroxide. To the starch paste 300 parts of N-(2,3 epoxypropyl) trimethylammonium chloride are added. The reaction is allowed to proceed for 2 hours at 70° to 75° C.

The 100 parts of sodium hydroxide in 200 parts of water are introduced, whereupon 450 parts of the sodium salt of bromoethane sulphonic acid are slowly added. The reaction mixture is maintained at a temperature of 70° to 75° C. for 1 hour. The mixture is neutralized with mineral acid and roll dried at a temperature of about 150° C. The dry product has the following properties:

Trimethylammoniumhydroxypropyl groups, DS ___ 0.19
Sulphoethyl groups, DS _____ 0.20
Isoelectric point, pH _____ 2.3 to 2.8
Gold number _____ 0.005

When 1 part of the starch derivative is mixed with 4 parts of water at room temperature a clear, cohesive dispersion of intermediate viscosity is obtained. The dispersion is diluted with water and enough ethyl alcohol is added to precipitate the starch product. The precipitate is extracted with aqueous ethyl alcohol, dehydrated with 96% ethyl alcohol and dried.

1 part of the purified product may be stirred with 8 parts of water at room temperature to give about the same viscosity as the above dispersion of 1 part of unpurified starch derivative in 4 parts of water.

The purified mixed starch ether is an excellent stabilizer for the homopolymerization or copolymerization of vinyl acetate and other vinyl monomers in aqueous dispersion.

Example 7

This example illustrates the use of a mixed cationic-anionic starch derivative in paper coating. The acid modified diethylaminoethylsulphopropyl ether of starch of Example 2 is used in this case. A clay slurry is made by mixing 100 parts of china clay, 0.3 part of sodium tetrapyrophosphate and 67 parts of water. Into this slurry a dispersion of 25 parts of the starch derivative of Example 2 in 75 parts of water is blended, upon which the pH is adjusted to 6.5. The 0.25 part of an 80% aqueous syrup of partially methylated trimethylolmelamine are introduced.

Similar coating compositions are prepared, using the three-, five-, seven- and tenfold amount of the trimethylolmelamine resin.

The coating compositions are applied to one side of a moderately resin sized paper in an amount 16 g. of dry substance per sq. m., by means of a spirally wound rod, whereupon the paper is dried during 5 minutes at 110° C.

The next day the wet-rub resistance of the coated paper is determined by means of an Adams Wet-rub (Montague Machine Co., Turners Falls, Mass., U.S.A.). In this apparatus ¾ inch wide test strips are contacted for 10 seconds with a rotating wet rubber roll. In case of insufficient wet-rub resistance the clay pigment particles are loosened from the coating and collected in a predetermined volume of water in a sample pan. The turbidity of the water is determined by measuring the light transmission by means of an absorptiometer, the transmission of distilled water being 100%. In this manner the following transmission values are found.

Percent resin added: | Percent transmission
--- | ---
1 | 90
3 | 98
5 | 99
7 | 100
10 | 100

These figures show that by using very low percentages of an aminoplast resin in combination with the mixed polysaccharide derivative, an excellent wet-run resistance is obtained.

Example 8

Corn starch is treated in aqueous alkaline suspension at 40° C. with 3% of diethylaminoethylchloride for 20 hours as described in Example 1. The resulting reaction mixture is neutralized and filtered and the starch product thus obtained is washed and dried.

100 parts of this cationic starch ether are then suspended in 150 parts of water, to which 0.8 part of sodium hydroxide have been added. The suspension is kept at a temperature of 22° C., whereupon 4 parts of trimethylamine-sulfur trioxide complex is added. Agitation is then maintained for 16 hours at 22° C. The pH of the reaction mixture is adjusted to appr. 7 with dilute sulfuric acid and the starch product is filtered, thoroughly washed with water and dried. The dried product has the following analysis:

Diethylaminoethyl groups, DS _____ 0.03
Sulfate groups, DS _____ 0.03
Isoelectric point, pH _____ 6.5

1 part of the product is dispersed by cooking with 8 parts of water. From this dispersion films are made using the method described in Example 2. The films show a reduced water solubility in comparison with corn starch derivatives containing only diethylaminoethyl groups or only sulfate groups.

Example 9

100 parts of guar gum are while being agitated sprayed with 7 parts of the reaction product of trimethylamine and epichlorhydrine dissolved in 18 parts of water. The mixture is predried in a vacuum chamber until a moisture content of 6% is obtained. The gum containing the trimethylamineepichlorhydrine reaction product is then heated in a thin layer for 3 hours at a temperature of 120° C.

Upon cooling the cationic gum derivative is intimately mixed with 4.5 parts of phosphoric acid (calculated as 89% acid), which has been neutralized with a sodium hydroxide solution to a pH of 5.0. The mixture is then predried again in a vacuum chamber and finally heated in a thin layer for 3 hours at a temperature of 160° C.

The analysis of the gum derivative containing cationic and anionic groups is:

Trimethylammoniumhydroxypropyl, DS _____ 0.05
Phosphate groups, DS _____ 0.05

The modified guar gum, when used as internal sizing agent for paper, gives paper of improved physical properties.

I claim:
1. A mixed cationic-anionic polysaccharide derivative derived from a water dispersible polysaccharide selected from the group consisting of starch, guar gum, carob gum and tamarind seed gum and bearing on separate places in the polysaccharide molecule
   (a) a cationic substituent which does not contain a hydrocarbon chain having more than 4 carbon atoms and which carries an electropositively charged grouping selected from the group consisting of primary, secondary and tertiary amine groups, quaternary ammonium groups, phosphonium groups, sulfonium groups and imino groups, and
   (b) an anionic substituent which does not contain a hydrocarbon chain having more than 4 carbon atoms and which carries an electronegatively charged grouping, selected from the group consisting of carboxyl groups, sulfonate groups and sulfate groups, which derivative has an isoelectric point within the pH range of between about 2 and about 10.5.

2. A mixed cationic-anionic polysaccharide derivative according to claim 1, in which both the cationic and the anionic substitutent are ether substituents.

3. A mixed cationic-anionic polysaccharide derivative according to claim 1, in which the cationic substituent is an ether substituent and the anionic substituent an ester substituent.

4. A mixed cationic-anionic polysaccharide derivative according to claim 1, in which the degree of substitution of both the cationic substituent and the anionic substituent is at least 0.02.

5. A mixed cationic-anionic polysaccharide derivative according to claim 1, in which the polysaccharide is starch, the granules of which are ungelatinized.

6. A mixed cationic-anionic polysaccharide derivative according to claim 1, in which the polysaccharide is starch, the granules of which have been gelatinized.

7. A mixed cationic-anionic starch derivative according to claim 1, in which the cationic substituent is a dialkylaminoalkyl group and the anionic substituent a sulfoalkyl group.

8. A mixed cationic-anionic starch derivative according to claim 1, in which the cationic substituent is a dialkylaminoalkyl group and the anionic substituent a carboxyalkyl group.

9. A mixed cationic-anionic starch derivative according to claim 1, in which the cationic substituent is a dialkylaminoalkyl group and the anionic substituent a sulfate group.

10. A mixed cationic-anionic starch derivative according to claim 1, in which the cationic substituent is a trialkylammonium hydroxyalkyl group and the anionic substituent a sulfoethyl group.

11. A method of producing mixed cationic-anionic polysaccharide derivatives which comprises reacting a water dispersible polysaccharide selected from the group consisting of starch, guar gum, carob gum and tamarind seed gum in any desired order with (a) a reagent selected from the group consisting of etherifying agents which do not contain a hydrocarbon chain having more than 4 carbon atoms and esterifying agents which do not contain a hydrocarbon chain having more than 4 carbon atoms, said reagents being capable of introducing into the polysaccharide molecules an electropositively charged substituent selected from the group consisting of primary, secondary and tertiary amine groups, quaternary ammonium groups, phosphonium groups, sulfonium groups and imino groups, and (b) a reagent selected from the group consisting of etherifying agents which do not contain a hydrocarbon chain having more than 4 carbon atoms, and esterifying agents which do not contain a hydrocarbon chain having more than 4 carbon atoms, said reagents being capable of introducing into the polysaccharide molecules an electronegatively charged substituent selected from the group consisting of carboxyl groups, sulfonate groups and sulfate groups, the nature of and the ratio between the reagents (a) and (b) being selected to produce a polysaccharide derivative having an isoelectric point between about 2 and about 10.5.

12. A method according to claim 11, in which starch is reacted in aqueous medium under non-gelatinizing conditions of alkalinity and temperature with reagents (a) and (b).

13. A method as claimed in claim 11, in which starch is first gelatinized in aqueous medium and then reacted with reagents (a) and (b).

14. A method as claimed in claim 11, in which the polysaccharide derivative is further modified by reaction in an aqueous medium with a modifying agent of the group consisting of inorganic acids and oxidizing agents.

References Cited

UNITED STATES PATENTS

| | | | |
|---|---|---|---|
| 2,812,324 | 11/1957 | Huber et al. | 260—209 |
| 2,894,944 | 7/1959 | Paschall | 260—209 |
| 3,046,272 | 7/1962 | Strating et al. | 260—209 |
| 3,098,869 | 7/1963 | Borchert | 260—209 |
| 3,247,048 | 4/1966 | Gaertner | 260—209 |
| 3,300,473 | 1/1967 | Christoffel et al. | 260—209 |
| 3,376,282 | 4/1968 | Schweiger | 260—209 |

LEWIS GOTTS, Primary Examiner

JOHNNIE R. BROWN, Assistant Examiner

U.S. Cl. X.R.

106—205, 210; 117—156; 162—175; 210—54; 252—8.8, 8.9, 351; 260—2.5, 17.4, 233.3, 234